UNITED STATES PATENT OFFICE.

STEPHEN KRACKOWIZER, OF HOBOKEN, NEW JERSEY.

IMPROVEMENT IN TOBACCO-EXTRACTS.

Specification forming part of Letters Patent No. 179,323, dated June 27, 1876; application filed May 6, 1876.

*To all whom it may concern:*

Be it known that I, STEPHEN KRACKOWIZER, of Hoboken, in the county of Hudson and State of New Jersey, have invented a new and useful Improvement in the Preparation of Extracts from Tobacco-Stems, which improvement is fully set forth in the following specification:

This invention consists in a process for preparing an extract from tobacco-stems by subjecting the same in a moist and partly-fermented state to the action of live steam for a short time for the purpose of expelling the noxious nicotine, then increasing the steam-pressure for the purpose of extracting the less volatile nicotianine, and finally allowing the residue to ferment, and treating the fermented matter with water, either pure or mixed with alcohol. The liquids thus obtained are boiled down to the consistency of extracts, and to the extract thus obtained is finally added a suitable quantity of nicotianine.

It is a well-known fact that tobacco-stems are composed of the same organic matters as the leaves, with that difference, however, that the stems contain about fifty per cent. more cellulose or wood-fiber than the leaves. It may be assumed that in one hundred pounds of leaves about the same quantity of soluble and insoluble constituents is obtained as in one hundred and fifty pounds of stems. In the finer brands of tobacco, such as Havana and Florida, the quantity of cellulose rises sometimes to from sixty to seventy per cent.; but the valuable volatile and soluble parts in the stems of such brands of fine quality have a proportionately-increased value, because these parts come very near to the best quality of leaves, a fact which I have demonstrated by a large number of experiments.

The extract which forms the subject-matter of my present invention consists, essentially, of a mixture of nicotianine with the extract obtained by treating tobacco-stems with water, either pure or mixed with alcohol.

The tobacco-stems are moistened and partly fermented, and in this state I expose the same to the action of steam for the purpose of expelling the noxious nicotine. This object is accomplished in a short time. I then increase the pressure of steam to from forty to sixty pounds per square inch for the purpose of extracting the nicotianine, which substance imparts to the tobacco its peculiar flavor. The nicotianine is collected in a suitable receiver. The stems which form the residuum from the above operation are then allowed to ferment, and the fermented mass is subjected to the action of water, with or without alcohol, and without heat.

The liquids resulting from this operation are finally boiled down to the consistency of extracts, and to these extracts is added a quantity of nicotianine sufficient to impart to the same the required flavor.

The compound thus obtained is entirely free from nicotine, and it can be used with great advantage for flavoring inferior brands of tobacco so as to render the same equal or nearly so to the most valuable sorts of tobacco.

I am aware that tobacco-leaves have been subjected to the action of steam, with or without pressure, for the purpose of freeing the same from nicotine. This I do not claim.

What I claim as new, and desire to secure by Letters Patent, is—

The within-described process for preparing an extract from tobacco-stems, by first extracting the nicotianine, then allowing the residue to ferment, and producing from the fermented matter an extract which is boiled down and finally mixed with a suitable quantity of nicotianine, substantially as set forth.

In testimony that I claim the foregoing I have hereunto set my hand and seal this 5th day of May, 1876.

STEPHEN KRACKOWIZER. [L. S.]

Witnesses:
J. VAN SANTVOORD,
E. F. KASTENHUBER.